Patented Aug. 3, 1954

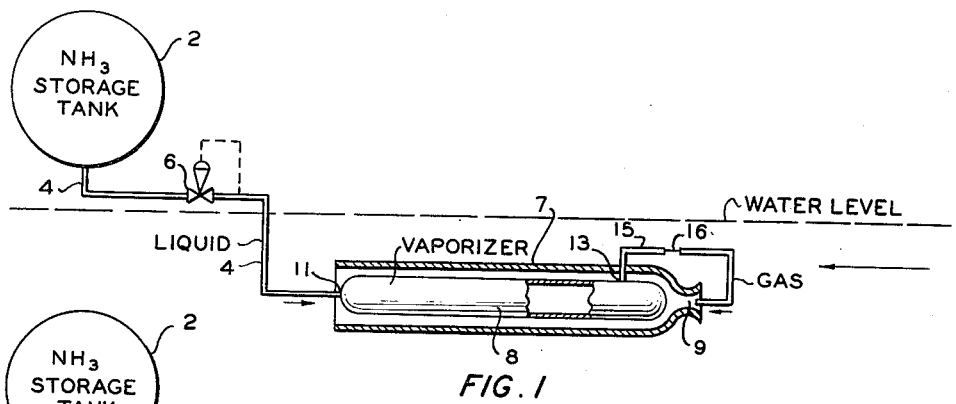
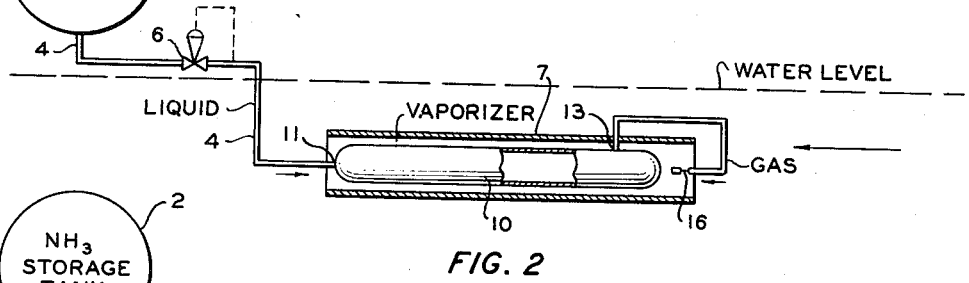
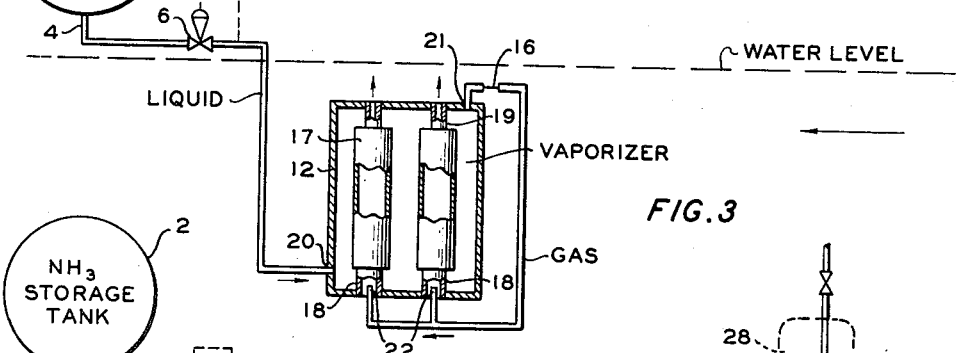
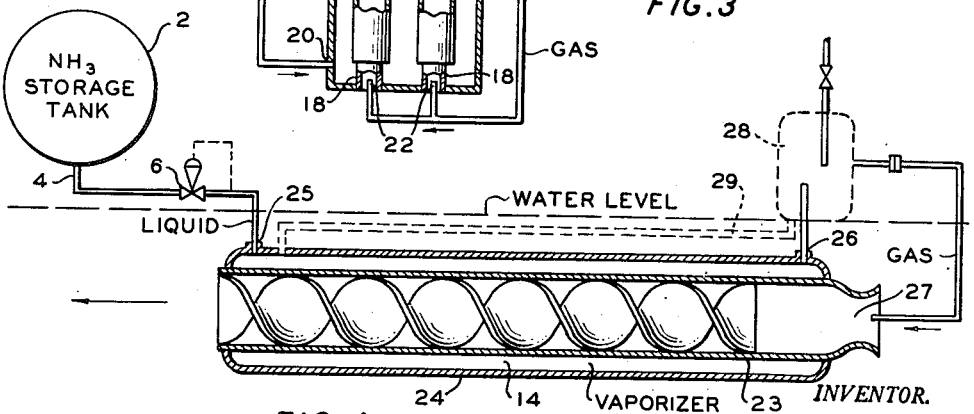

2,685,151

UNITED STATES PATENT OFFICE 2,685,151

VAPORIZATION OF AMMONIA

Elton E. Rush, Waco, Tex., assignor to Phillips Petroleum Company, a corporation of Delaware Application November 3, 1952, Serial No. 318,487

10 Claims. (Cl. 47—58)

This invention pertains to the vaporization of liquid ammonia. This invention also relates to the direct use of ammonia as a fertilizer. This invention is particularly useful where fertilizing material is delivered to soils by means of natural waters.

Although in the past ammonia liquors have been used only indirectly for fertilization of plants, promising results are now being obtained in certain areas for their direct use. In irrigated areas, ammonia liquor is added to irrigation waters, and stimulation of plants from such treatment has been found very rapid. According to these processes ammonia is passed into irrigation water in such controlled low amounts that a concentration of ammonia is produced in the water which is so low that injury of the vegetation will not result upon the water coming into contact with the vegetation. Various metering devices are employed for adding ammonia but control is difficult, particularly when ammonia is added to the irrigation water from cylinders of anhydrous liquid ammonia. In the use of anhydrous liquid ammonia in irrigation water for fertilizer purposes it is preferred to vaporize the ammonia before introducing it into the water because of difficulties encountered in metering the ammonia in liquid form. When liquid ammonia is used, dirt and compressor oil plug metering orifices make its use undesirable. However, the latent heat of vaporization of ammonia is so great that its vaporization in large-scale applications requires that heat be supplied at a greater rate than can be done conveniently by atmospheric heat exchange. Some improvement can be obtained by heat exchange with the irrigation water, provided its temperature and rate of flow are sufficient, but even this is insufficient in some cases to vaporize the ammonia at the desired rate.

It is an object of this invention to provide an improved method and apparatus for the vaporization of liquid ammonia and for the introduction of ammonia into irrigation water. Another object of the instant invention is to provide an improved method of vaporizing ammonia for use in irrigation water. Other objects and advantages will become apparent to those skilled in the art from the following disclosure and description.

In accordance with an aspect of the present invention ammonia is vaporized at a satisfactory rate for metering and introduction into irrigation water by introducing ammonia into the water in such a way that the heat of solution of the ammonia in the water is utilized in evaporating the ammonia. In accordance with another aspect of this invention means are provided for the introduction of ammonia into water so that the hot solution is caused to flow rapidly over ammonia vaporizer surfaces, thereby increasing heat transfer rates. Thus a process for vaporizing ammonia at a rate satisfactory for introduction into irrigation water is provided by partially vaporizing liquid ammonia and utilizing heat of solution produced by the dissolution of said ammonia vapor in water to effect further vaporization.

In the practice of this invention any of the various modifications of apparatus illustrated in the accompanying drawings can be used advantageously. Referring now to the drawings four such modifications are shown.

In Figure 1 one embodiment with an internal vaporizer is shown partially in section. The outer cylindrical shell around the vaporizer is smaller at one end to form a flow-inducing or inspirating venturi or restriction.

Figure 2 shows an apparatus similar to that of Figure 1 but the shell inlet is not restricted.

In Figure 3 the outer chamber is the vaporizer and fluid passes through the inner cylinders as shown.

In Figure 4 the jacket around the fluid conduit serves as the vaporizer.

In each modification, Figures 1 through 4, liquid ammonia is withdrawn from a storage tank 2 through line 4 and a pressure-reducing regulator 6 and introduced into a vaporizer at a pressure in the range 10 to 40 p. s. i. g. The vaporizers are designated as 8, 10, 12 and 14 in Figures 1, 2, 3, and 4 respectively. Gaseous ammonia from the vaporizer is then passed through a metering orifice 16 and introduced into the water in such a way as to cause the resulting solution to flow over the surface of the vaporizer, thereby permitting the heat of solution given off as the ammonia dissolves to be taken up by the liquid ammonia as it evaporates.

The particular design employed is a matter of selection, but in some cases may depend upon conditions such as how rapidly the irrigation water is flowing and whether the water is clear or muddy. For example if the flow of irrigation water is slow the embodiment shown in Figure 1 can be used. If the water is muddy Figure 2 will be more desirable than Figure 1.

In the apparatus shown in Figure 1, to be submerged in an irrigation ditch, is a substantially cylindrical shell 7 open at each end and tapered at one end (the upstream end) to form a flow-inducing venturi 9. Concentric within shell 7 is a substantially cylindrical chamber 8 having an inlet 11 in one end and an outlet 13 in the side near the opposite end. Chamber 8 is sufficiently small so that water will readily flow between shell 7 and chamber 8. Inlet 11 to chamber 8 is desirably opposite or down stream from venturi 9. Connected to outlet 13 is a conduit 15 having an orifice 16 therein. Conduit 15 has an open end terminating in an axial position within venturi 9. Connected to inlet 11 is a conduit 4 leading to a liquid ammonia storage tank 2 at the surface. A downstream pressure regulator 6 is disposed in line 4 to keep the pressure in chamber 8 constant. In this way flow can be controlled by orifice 16. In the modification shown in Figure 1, the gaseous ammonia is released into a venturi formed in the upstream end of the annular shell surrounding the vaporizer. The ammonia inspirates water into the annular space, thereby increasing the rate of flow of water past the vaporizer. The heat of solution of ammonia in water raises the temperature of the solution flowing through the annular space. Both of these effects contribute to improved heat transfer rates in the ammonia vaporizer, thus increasing its capacity.

In Figure 2 the annular shell 7 has been modified so as to eliminate the venturi. The metering orifice 16 is located at the end of the gaseous ammonia line, within the upstream end of the shell. Operation is the same as in Figure 1, in that the hot solution of ammonia in water flows over the surface of the vaporizer at a rate faster than the normal flow of irrigation water.

In Figure 3 the vaporizer is in the form of an outer chamber 12. Disposed within chamber 12 are vertical cylinders 17 forming flow channels and having inlets 18 and outlets 19 which pass through chamber 12. Chamber 12 is closed except for inlet 20 and outlet 21. Ammonia storage tank 2, connected to inlet 20 through line 4, has a pressure regulator therein as described for Figure 1. Also as in Figure 1 a conduit having disposed therein an orifice 16 is connected to vaporizer outlet 21. This conduit is adapted with two open ends 22 which terminate in axial positions within inlets 18 to flow channels 17. In the modification shown in Figure 3, gaseous ammonia is released through these outlets 22 and the resulting hot solution rises by convection around and through the vaporizer. This modification is particularly suited for use where the natural flow of the irrigation water is at a slow rate.

In the apparatus illustrated in Figure 4 the water flow shell 23 is in cylindrical form having a tapered end 27 as in Figure 1. The vaporizer in this arrangement is an outer concentric cylinder 24 having a larger diameter so that a zone 14 is formed therebetween. Outer cylinder 24 is shorter than inner shell 23 so that the ends of the outer cylinder can be connected to said inner shell 23 forming a closed annular chamber. This closed annular chamber is provided with an inlet 25 connected through line 4 with ammonia storage tank 2, line 4 having a downstream pressure regulator therein. In the line leading from outlet 26 to tapered end 27 as in Figure 1, a liquid trap 28 is provided. Numeral 29 designates the liquid return line.

Thus in accordance with an embodiment of this invention the inspirating of ammonia improves circulation across vaporizer surfaces thereby improving the rate of heat transfer. Calculations leading to the determination of heat transfer, and to the determination of the area of heat exchange surface are well understood by those skilled in the art and form no part of this invention. Heat transfer will be a funtcion of the film resistance, the heat transfer coefficient the metal employed in the vaporizer and the temperature difference. The temperature of water in an irrigation ditch will be somewhat constant, usually below 60° F. or 70° F., and the heat of solution or the heat evolved when ammonia is dissolved in water will be known. Calculations leading to the determination of the area of heat exchange can be readily carried out by one skilled in the art. With this invention essentially constant NH3 flow can be obtained dependent only on pressure downstream of regulator and on orifice size. Flow to the vaporizer will be such that the pressure therein is constant and the quantity of vapor metered will be determined by the size of the orifice. Relatively small variation in water temperature, say 40° F. to 70° F., will only slightly affect the volume of ammonia employed. Thus in accordance with this invention ammonia can be vaporized at a satisfactory rate for metering and introduction into irrigation water by using the heat of solution of ammonia in water in evaporating the ammonia. In addition the introduction of ammonia into water can be carried out in the practice of this invention so that the hot solution is caused rapidly to flow over vaporizer surfaces thereby increasing heat transfer rates. Obviously other modifications or variations of the invention as set forth can be made without departing from the spirit and scope thereof.

I claim:

1. A process for vaporizing liquid ammonia at a rate satisfactory for metering and introduction into irrigation water which comprises partially vaporizing liquid ammonia beneath the surface of the irrigation water, conducting the ammonia vapors into the irrigation water, and utilizing the heat of solution of ammonia in water to aid in effecting further vaporization of liquid ammonia.

2. A process for vaporizing liquid ammonia at a rate satisfactory for metering and introduction into irrigation water which comprises passing liquid ammonia into a vaporizer disposed beneath the surface of the irrigation water thereby vaporizing a portion of said ammonia, passing ammonia vapors from the vaporizer to the irrigation water thereby heating a portion of said water as ammonia dissolves, and passing said hot solution of ammonia and water over the vaporizer surfaces to further vaporize liquid ammonia thereby making the process continuous.

3. A process for vaporizing liquid ammonia at a rate satisfactory for metering and introduction into irrigation water which comprises passing liquid ammonia from storage to a vaporizer disposed beneath the surface of the irrigation water thereby vaporizing a portion of said ammonia, conducting the ammonia vapors from the vaporizer to a gas metering device, passing the ammonia vapors from said metering device to the irrigation water to form a solution of ammonia and water, passing said solution retaining the heat of solution of ammonia in water over the surface of the vaporizer to further vaporize liquid ammonia thereby making the process continuous.

4. An apparatus for the introduction of ammonia into irrigation water which comprises in combination, an outer chamber, a chamber within said outer chamber forming a wall of a zone therebetween, one chamber being substantially tubular and open at each end to permit flow of fluid therethrough, the other chamber being closed except for an outlet and an inlet therein, a storage vessel, a conduit connecting the inlet of said closed chamber to the storage vessel, a conduit connected to the outlet of said closed chamber and opening into the inlet end of the open tubular chamber, and a gas metering device in the outlet conduit to said closed chamber.

5. An apparatus for the introduction of ammonia into irrigation water which comprises in combination, an outer chamber, a chamber within said outer chamber forming a wall of a zone therebetween, one chamber being tubular and open at each end to permit flow of fluid therethrough, the other chamber being closed except for an outlet and an inlet therein, said chambers being adapted so that fluid flows through said open tubular chamber from an external source, a storage vessel, a conduit connecting the inlet of said closed chamber to the storage vessel, a downstream pressure regulator in said conduit, and a conduit connected to the outlet of said closed chamber and opening into the inlet end of the open tubular chamber, said conduit having an orifice therein.

6. An apparatus for the introduction of ammonia into irrigation water which comprises in combination, a cylindrical shell open at each end, a closed cylinder disposed within said cylindrical shell and having an inlet in one end and an outlet in the opposite end thereof, said closed cylinder having a predetermined surface area and a diameter smaller than said shell to permit the flow of liquid between the two cylinders, an air tight storage tank, a closed conduit forming a connection between said storage tank and the inlet in said closed cylinder to permit the flow of liquid therebetween, a downstream pressure regulator disposed in said conduit, and a second closed conduit having one end connected to the outlet in said closed cylinder and the other end opening into one end of the outer shell a predetermined distance from said closed cylinder, said second conduit having an orifice disposed in said second conduit adjacent said other end of said second conduit, said orifice thereby being disposed within the end of the outer shell.

7. An apparatus for the introduction of ammonia into irrigation water which comprises in combination, a cylindrical shell open at each end, and having a neck of smaller diameter at its inlet end to form a restriction in the passageway therethrough, a closed cylinder disposed within said cylindrical shell and having an inlet in one end an an outlet in the opposite end thereof, said closed cylinder having a predetermined surface area and a diameter smaller than said shell to permit the flow of liquid between the two cylinders, and air tight storage tank, a closed conduit forming a connection between said storage tank and the inlet in said closed cylinder to permit the flow liquid therebetween, a downstream pressure regulator disposed in said conduit, and a second conduit having one end connected to the outlet in said closed cylinder and having the other end opening into the restricted inlet of the outer cylinder shell a predetermined distance from said closed cylinder, said second conduit having an orifice therein.

8. An apparatus for the introduction of ammonia into irrigation water which comprises in combination, a cylinder having a helical ribbon therein, both ends open, and a neck of smaller diameter at its inlet end to form a restriction in the passageway therethrough, a jacket around the periphery of said cylinder and connected thereto to form a closed chamber around said cylinder, an inlet end an outlet in said jacket, an airtight storage tank, a tube forming a connection between the inlet in said jacket and said storage tank, a downstream pressure regulator in said tube, a vapor outlet tube connected to the outlet in said jacket, a liquid trap in cooperation with said outlet tube, a second vapor outlet tube connected at one of its ends to said trap and opening at its other end into the restricted inlet of the cylinder, said second tube having an orifice therein, and a liquid return line leading from said trap to the chamber formed by the jacket.

9. An apparatus for the introduction of ammonia into irrigation water which comprises in combination, a plurality of vertical cylinders, inlets and outlets in the ends of each cylinder, a container enclosing the cylinders, the inlets and outlets of each cylinder passing through said container to permit flow of fluid therethrough from a source outside of said container, an air-tight storage tank, a tube forming a connection between said storage tank and an inlet to said closed container to permit the flow of liquid therebetween, a downstream pressure regulator disposed in said tube, and a second tube with an orifice therein having one end connected to an outlet in said closed container and having the other end adapted to open into the inlet ends of each cylinder a predetermined distance from said closed cylinder.

10. A process for vaporizing liquid ammonia at a rate satisfactory for metering and introducing into irrigation water which comprises, submerging a vaporizer containing liquid ammonia in a body of irrigation water, withdrawing vaporous ammonia from the vaporizer and directing said vaporous ammonia through a venturi and thereafter through a confined region bounding said vaporizer, thereby inspirating the water through the venturi and forming a solution of the ammonia in the water, said solution being heated by the heat of solution of the ammonia in the water, whereby the heated solution of ammonia in the irrigation water is passed over surfaces of said vaporizer thereby heating the surfaces of the vaporizer and further vaporizing said liquid ammonia.

References Cited in the file of this patent

UNITED STATES PATENTS

| Number | Name | Date |
|---|---|---|
| 1,173,534 | Ryan | Feb. 29, 1916 |
| 2,020,824 | De Bruyn | Nov. 12, 1935 |
| 2,038,316 | Rosenstein | Apr. 21, 1936 |
| 2,038,511 | Kortlandt | Apr. 21, 1936 |
| 2,088,069 | Porter | Aug. 3, 1937 |
| 2,206,089 | Gray | July 2, 1940 |

FOREIGN PATENTS

| Number | Country | Date |
|---|---|---|
| 560,063 | Germany | Sept. 15, 1932 |